(12) United States Patent
Rolfes

(10) Patent No.: US 9,399,509 B2
(45) Date of Patent: Jul. 26, 2016

(54) VENT STRINGER FITTING

(71) Applicant: The Boeing Company, Chicago, IL (US)

(72) Inventor: Corey A. Rolfes, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 176 days.

(21) Appl. No.: 14/249,735

(22) Filed: Apr. 10, 2014

(65) Prior Publication Data

US 2015/0336656 A1 Nov. 26, 2015

(51) Int. Cl.
| | | |
|---|---|---|
| *B64C 3/00* | (2006.01) | |
| *B64C 3/18* | (2006.01) | |
| *B64C 3/26* | (2006.01) | |
| *B64C 3/34* | (2006.01) | |
| *B64D 37/00* | (2006.01) | |

(52) U.S. Cl.
CPC . *B64C 3/182* (2013.01); *B64C 3/26* (2013.01); *B64C 3/34* (2013.01); *B64D 37/005* (2013.01); *Y10T 29/49623* (2015.01)

(58) Field of Classification Search
None
See application file for complete search history.

(56) References Cited

U.S. PATENT DOCUMENTS

| | | | | |
|---|---|---|---|---|
| 4,645,244 | A * | 2/1987 | Curtis | F16L 27/0857 285/114 |
| 4,802,642 | A * | 2/1989 | Mangiarotty | B64C 23/00 244/130 |
| 5,263,747 | A * | 11/1993 | Lefebvre | F16L 25/0036 285/226 |
| 5,370,427 | A * | 12/1994 | Hoelle | F16L 27/026 285/226 |
| 6,315,332 | B1 * | 11/2001 | Aschoff | F16L 27/11 285/226 |
| 6,458,309 | B1 * | 10/2002 | Allen | B29C 70/446 156/197 |
| 7,040,666 | B2 * | 5/2006 | Christianson | F02K 1/80 285/145.5 |
| D551,336 | S * | 9/2007 | Haggkvist | D23/386 |
| 8,167,245 | B1 * | 5/2012 | Koehler | B64C 3/34 244/123.1 |
| 8,776,351 | B2 * | 7/2014 | Bird | F16L 21/022 277/603 |
| 9,010,689 | B1 * | 4/2015 | Brook | B64D 37/32 244/135 R |
| 2008/0128554 | A1 * | 6/2008 | Pham | B64C 3/26 244/131 |
| 2008/0302912 | A1 * | 12/2008 | Yip | B29C 43/10 244/119 |
| 2008/0302915 | A1 * | 12/2008 | Yip | B29C 70/342 244/132 |
| 2009/0072088 | A1 * | 3/2009 | Ashton | B64C 3/185 244/124 |
| 2009/0127393 | A1 * | 5/2009 | Guzman | B29C 44/583 244/133 |
| 2009/0266936 | A1 * | 10/2009 | Fernandez | B64C 1/061 244/119 |
| 2010/0139850 | A1 * | 6/2010 | Morris | B29C 33/485 156/242 |
| 2010/0139857 | A1 * | 6/2010 | Pham | B29C 70/446 156/286 |
| 2010/0304094 | A1 * | 12/2010 | Brook | B29C 70/222 428/174 |
| 2011/0027526 | A1 * | 2/2011 | McCarville | B29C 70/30 428/116 |
| 2011/0073155 | A1 * | 3/2011 | Sillmann | F24J 2/5203 136/244 |
| 2012/0069432 | A1 * | 3/2012 | Liang | G02B 7/14 359/401 |
| 2012/0241560 | A1 * | 9/2012 | Erickson | B64D 37/06 244/131 |
| 2013/0049258 | A1 * | 2/2013 | Rotter | B29C 70/462 264/255 |
| 2013/0118624 | A1 * | 5/2013 | Burnickas | F16K 11/02 137/876 |

(Continued)

OTHER PUBLICATIONS

GB, Combined Search and Examination Report under Sections 17 and 18(3); Patent Application No. GB1506011.4 (Oct. 13, 2015).

*Primary Examiner* — Medhat Badawi

(74) *Attorney, Agent, or Firm* — Thompson Hine LLP

(57) ABSTRACT

A fitting for a vent stringer of a type having an open end and an outer edge defining the open end. The fitting may include a fitting body receivable along the open end of the vent stringer, the fitting body having a groove that generally corresponds with the outer edge of the vent stringer, the groove of the fitting body shaped to receive the outer edge of the vent stringer to create a tongue and groove joint with the outer edge; and a connection between the fitting and the stringer to prevent slidable movement of the fitting relative to the stringer.

16 Claims, 7 Drawing Sheets

(56) References Cited

U.S. PATENT DOCUMENTS

| | | | |
|---|---|---|---|
| 2013/0133171 A1* | 5/2013 | Miguez Charines | B29C 70/42 29/428 |
| 2013/0302172 A1* | 11/2013 | Williams | B64C 3/22 416/227 R |
| 2013/0316147 A1* | 11/2013 | Douglas | B64C 3/182 428/172 |
| 2013/0327477 A1* | 12/2013 | Hollensteiner | B29C 70/446 156/245 |
| 2014/0248140 A1* | 9/2014 | Jacques | F01D 5/303 415/183 |
| 2014/0262614 A1* | 9/2014 | Rushin | B65D 11/10 182/48 |
| 2014/0272312 A1* | 9/2014 | Sammons | B32B 7/12 428/172 |
| 2014/0284426 A1 | 9/2014 | Erickson | |
| 2014/0299713 A1* | 10/2014 | Komoda | B64C 3/26 244/123.1 |
| 2015/0252824 A1* | 9/2015 | Benthien | F16B 2/02 248/205.3 |
| 2015/0336656 A1* | 11/2015 | Rolfes | B64C 3/182 244/123.1 |

* cited by examiner

VENT STRINGER FITTING

TECHNICAL FIELD

This disclosure relates to a fitting for a vent stringer, and more particularly, to a fitting that cooperates with an outer edge of a vent stringer to create a tongue and groove joint.

BACKGROUND

The structure of an aircraft includes stringers that serve as stiffeners for structural reinforcement of wing panels. Some stringers, known as vent stringers, are configured not only for structural reinforcement but also for venting fuel tanks in the wing. Vent stringers may terminate between the outboard and center wings.

Vent stringers may be interrupted along their lengths by other structural members oriented transversely to the vent stringers. In such cases the vent stringers have open ends beside such transverse structural members, and are equipped with fittings that close the vein stringer but include a passage that continues the vent flow path onward from the open ends. The passage of such a fitting may be configured to connect a vent stringer with a vent opening that passes through a transverse structural member, or with a vent tube that bypasses the transverse structural member.

Current fittings at side-of-body (SOB) are complex in design, difficult to seal and time-consuming to assemble. Such fittings cannot be fully installed until after wing-to-body join when fasteners have been installed through the skin panel and splice strap. These fittings have multiple pieces that provide a path for the fuel vent system when sealed, but prevent access to the wing-to-body join fasteners without disassembling the fitting. Sealing part of the fuel vent system during wing-to-body join requires sealant to cure before leak tests can be performed and wing, fuel tank closed, resulting in long assembly flow hi other current applications, separate fuel vent system bypass fittings located outboard of the SOB are mechanically fastened to the stringer and require cutting an opening in the cap of the stringer and a corresponding increase in wing skin and stringer size locally to compensate for the opening. This results in a location well outboard of the SOB area and a long length of vent tubing required. It also requires sealing installation fasteners and a fuel (seal) data within the stringer that are difficult to access.

Accordingly, there is a need for a fitting design that is reliable, inexpensive to fabricate, and can be installed with a minimum of alteration to adjacent aircraft structure.

SUMMARY

In an embodiment, a fitting is disclosed for a vent stringer having an open end and an outer edge defining the open end. The fitting may include a body receivable along the open end of the vent stringer, the fitting body defining a groove that generally corresponds with the outer edge of the vent stringer, the groove of the fitting body shaped to receive the outer edge of the vent stringer to create a tongue and groove joint with the outer edge; and a connection between the fitting and the stringer to prevent slidable movement of the fitting relative to the stringer.

In another embodiment, an aircraft may include a vent stringer having, an open end and an outer edge located at the open end; and a fitting having a fitting body receivable along the open end of the vent stringer, the fitting body defining a groove that generally corresponds with the outer edge of the vent stringer, the groove of the fitting body shaped to receive the outer edge of the vent stringer to create a tongue and groove joint with the outer edge; and a connection between the fitting and the stringer to prevent slidable movement of the fitting relative to the stringer.

In yet another embodiment, a method of installing a fitting to a vent stringer, the vent stringer having an open end and an outer edge located at the open end, may include sliding the fitting in a longitudinal direction along the vent stringer, wherein the fitting defines a groove that generally corresponds with the outer edge of the vent stringer; receiving the outer edge of the vent stringer by the groove of the fitting body, wherein the groove of the fitting body is shaped to receive the outer edge of the vent stringer to create a tongue and groove joint with the outer edge; and providing a connection between the fitting and the stringer to prevent further slidable movement of the fitting relative to the stringer.

As described more fully below, the disclosed vent stringer fitting has advantages that establish a more secure closure of the open end of the vent stinger. Other objects and advantages of the disclosed vent stringer fitting will be apparent from the following description, accompanying drawings, and the appended claims.

DETAILED DESCRIPTION

Figure 1:
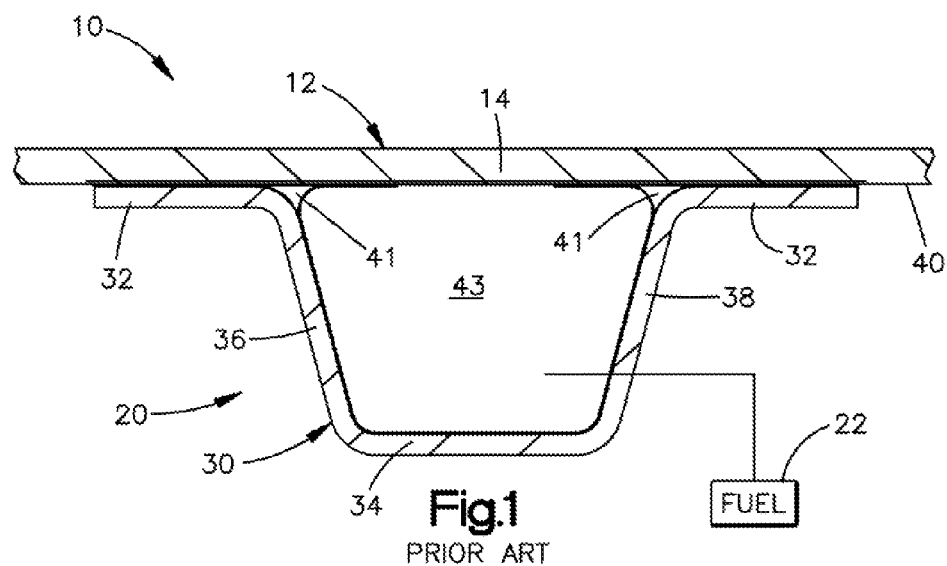
FIG. 1 is a sectional view of a vent stringer beneath an aircraft wing panel, as known in the prior art.

As shown partially in FIG. 1, an aircraft 10 may have a component such as a wing 12 having a panel 14 reinforced by stringers, one of which 20 is shown in the drawing. The aircraft 10 may include, fixed-wing aircraft such as jet aircraft and propeller-driven aircraft, movable-wing aircraft, and spacecraft. The stringer 20 may take the form of a vent stringer that vents a fuel tank 22 (shown schematically) located within the wing 12.

The vent stringer 20 may comprise a channel 30, and may include a pair of flanges 32 extending outwardly therefrom. The channel 30 may have three sides extending along its length, including a bottom side 34 between a pair of opposed sides 36 and 38. The flanges 32 may project transversely from the opposed sides 36 and 38 of the channel 30, and may adjoin an inner surface 40 of the wing panel 14. A pair of radius fillers 41 may be included as shown. In this arrangement the channel 30 and the wing panel 14 may form a duct 43 with four sides defined by and between the wing panel 14 and the sides 34, 36 and 38 of the channel 30. The duct 43 may be connected in venting communication with the fuel tank 22 in any suitable manner known in the art.

Figure 2:
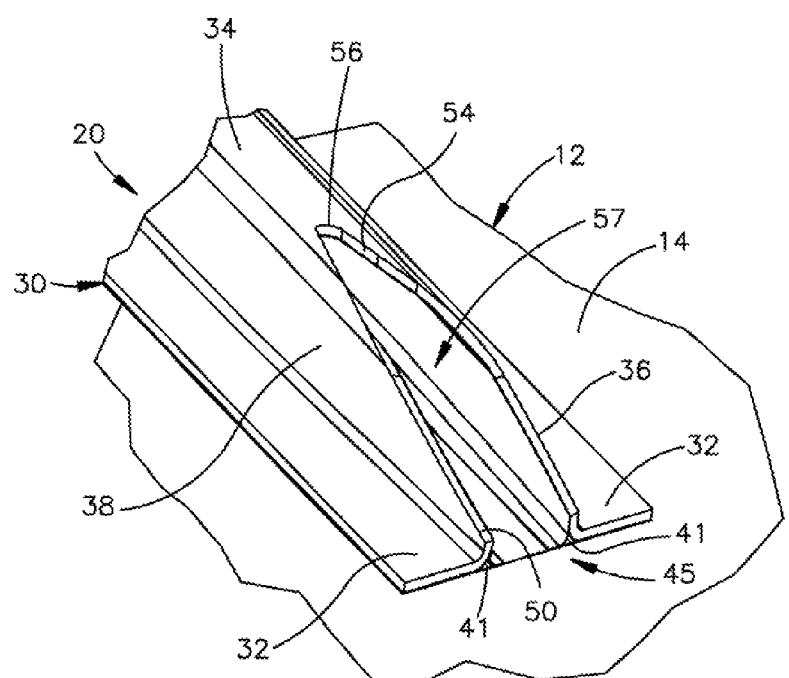
FIG. 2 is a perspective view of an end of the prior art vent stringer of FIG. 1, inverted for clarity of illustration.

As shown in FIG. 2, the vent stringer 20 may have an open end, generally designated 45, defined by an outer edge 50 of the channel 30. The outer edge 50 may extend fully across the flanges 32 and the sides 34, 36 and 38 of the channel 30. Additionally, the outer edge 50 may reach lengthwise along the sides 34, 36 and 38 as well as transversely across the sides 34, 36 and 38. A portion 54 of the outer edge 50 at the bottom side 34 of the channel 30 may have an elongated arcuate contour tapered toward a relatively narrow turn 56 mid-way across the bottom side 34. The illustrated example of the outer edge 50 may thus have a generally V-shaped contour providing the open end 45 of the vent stringer 20 with a correspondingly V-shaped slot 57.

As thus far described, the structure of the vent stringer 20 at the open end 45 is known in the art. Such an open end 45 may be provided beside a structural member (not shown) of the aircraft 10, such as a rib at an SOB joint, that is arranged with the aircraft transversely to the vent stringer 20. As further shown in FIG. 3, a known fitting 60 may be installed on the open end 45 to provide a vent opening 61 in alignment with a corresponding vent opening through the transverse structural member. Such a fitting 60 may include a cover 62 and a frame 64 that together overlie the sides 34, 36 and 38 of the channel 30 to enclose and cover the open end 45.

Figure 4:
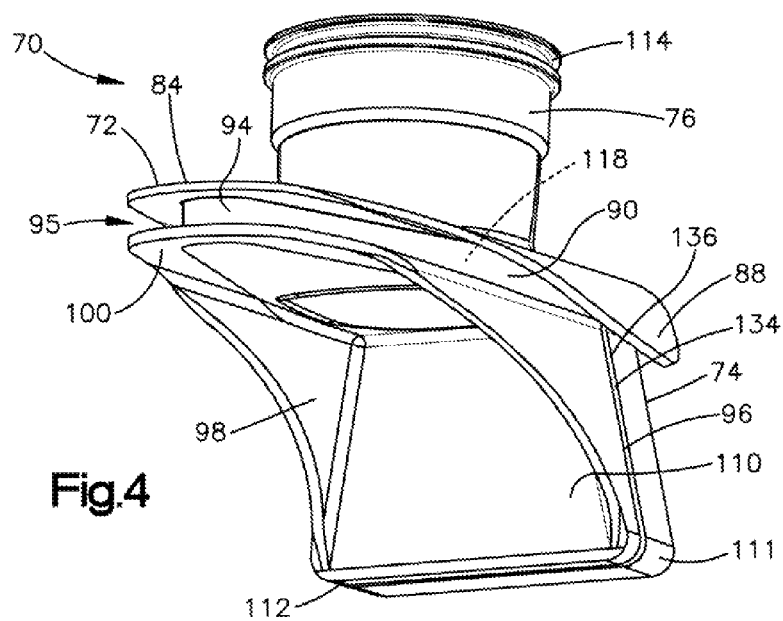
FIG. 4 is a perspective view of an embodiment of the disclosed vent stringer fitting.
Figure 5:
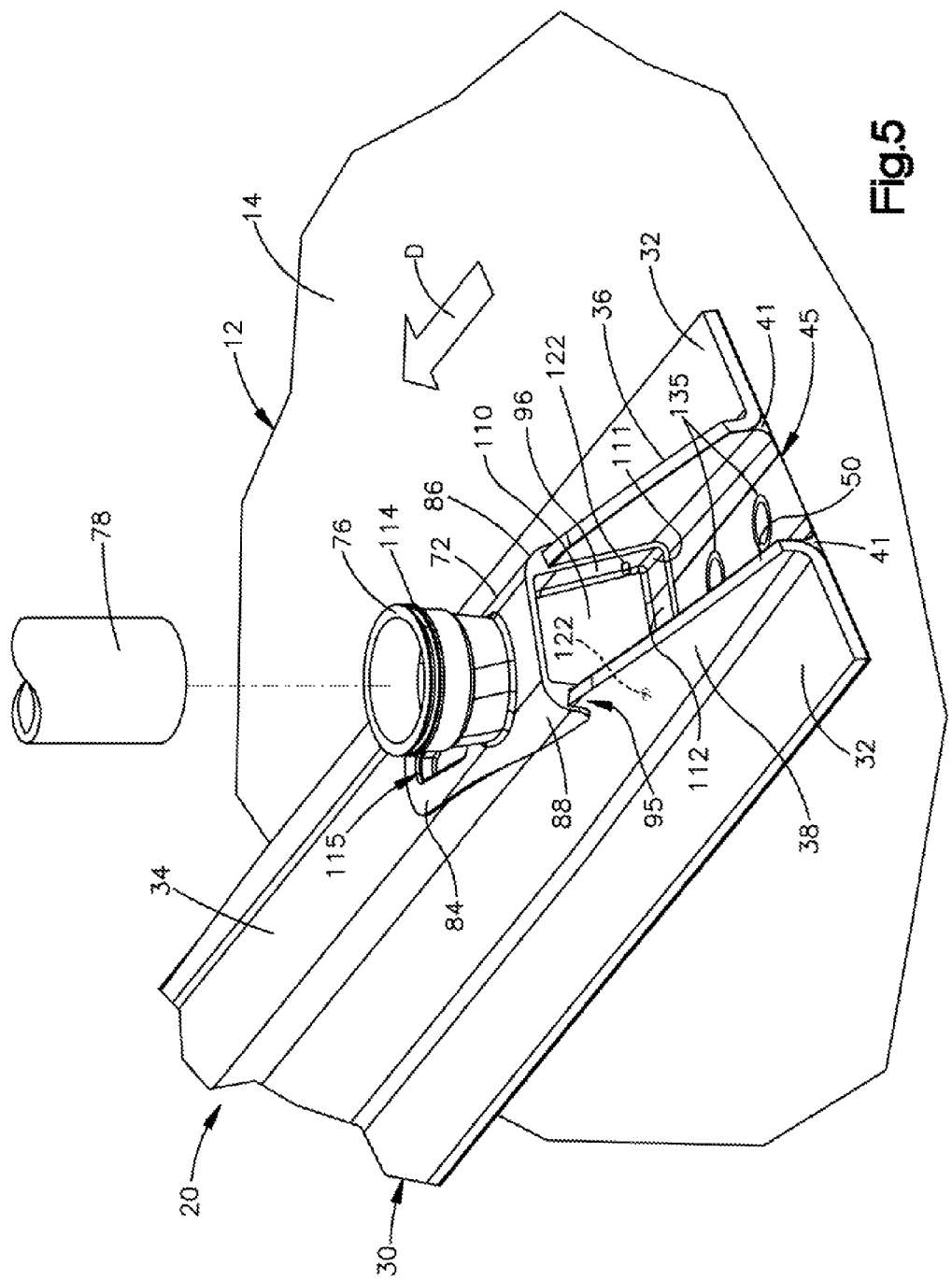
FIG. 5 is perspective view showing the fitting of FIG. 4 installed on the end of the prior art vent stringer of FIG. 2.

The subject vent stringer fitting, generally designated 70, is shown in FIG. 4. In an embodiment, the fitting 70 may be mounted on the open end 45 of the vent stringer 20 (FIG. 2) in an installed position, as shown in FIG. 5. The fitting 70 may include a fitting body 72 having a will structure 74 and a coupling 76. The coupling 76 may connect a vent tube 78 to the fitting 70. The coupling 76 may fluidly connect the channel 30 of the vent stringer 20 to the vent tube 78 for further venting of the fuel tank 22 beyond the vent stringer and fitting 70.

Figure 6:
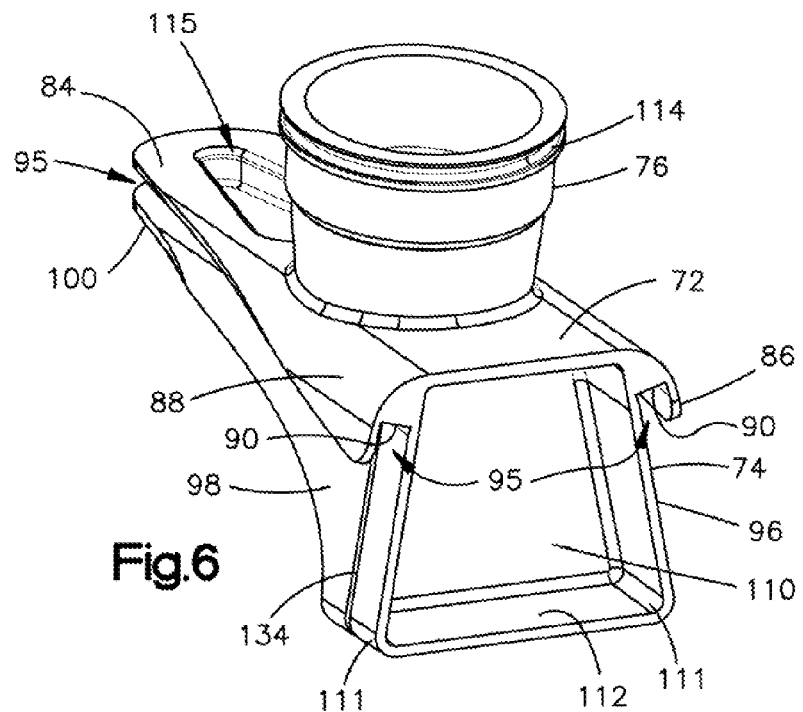
FIG. 6 is another perspective view of the fitting of FIG. 4.

As best shown in FIGS. 4, 5 and 6, the fitting body 72 may have a bottom side 84 and two opposing sides 86, 88 on either side of the bottom side. The sides 84, 86, 88 may be shaped to conform to the contours of the sides 34, 36 and 38, respectively, of the channel 30. In an embodiment, the sides 84, 86 and 88 of the fitting body 72 may be configured to complete the cross sectional configuration of the channel. 30 where the V-shaped slot 57 interrupts the sides 34, 36 and 38 of the channel 30.

The fitting body 72 also may include a mating edge 90 extending along the sides 84, 86 and 88 of the fitting body 72. The mating edge 90 of the fitting body 72 may extend along the sides 84, 86 and 88 of the fitting body 72. Referring to FIGS. 2, 5 and 6, the mating edge 90 of the fitting body 72 includes a profile that generally corresponds to the contour of the outer edge 50 located along the corresponding sides 34, 36 and 38 of the channel 30. In a specific embodiment, the mating edge 90 of the fitting body 72 generally corresponds in contour to the elongated arcuate contour defined by the V-shaped slot 57 of the vent stringer 20.

Referring to FIGS. 4-6, the mating edge 90 may be located within a groove 95 formed in the fitting body 72. The groove 95 may be defined between the wall structure 74 and the sides 84, 86, 88. In a specific embodiment, the wall structure 74 may include first and second opposing side walls 96 and 98. The opposing side walls 96, 98 may be shaped to engage and conform to the contours of the adjacent sides 36, 38, respectively, of the channel 30 to form a seal therewith. The side walls 96, 98 of the wall structure 74 may transition to an inner lip 100 that may be generally parallel to the top side 84 located between the first and second side walls 96 and 98.

The groove 95 may extend between the first side wall 96 and an adjacent side 86 of the fitting body 72. The groove 95 also may extend around, the turn 94 between the inner lip 100 and an adjacent side 84 of the fitting body 72, and further between the second side wall 98 and an adjacent side 88 of the fitting body 72. The wall structure 74 may include an end wall 110 and a base wall 112, as best shown in FIG. 4. In an embodiment, the base wall 112 may join the first and second side walls 96, 98 at radii 111 shaped to conform to the contours of the radius fillers 41 of the channel 30.

The coupling 76 of the fitting 70 may be generally cylindrical, and may include a ferrule 114 for receiving a clamp (not shown). The fitting 70 may also have a recess, such as the recess 115 at the narrow end of the fitting body 72, for reduction of material and weight (see also FIGS. 8 and 9).

As shown in FIG. 5, to mount the fitting 70 on the vent stringer 20, the fitting may be slid in a longitudinal direction D into the open end 45 of the channel 30 and into an installed position. In a specific embodiment, the fitting 70 may slide in the longitudinal direction D substantially parallel to the sides 34, 36, 38 of the channel 30 and into the open end 45 of the vent stringer 45 until the sides 34, 36 and 38 are received within and engage the groove 95 of the fitting 70. The mating edge 90 of the fitting body 72 and the outer edge 50 of the channel 30, which have matching contours but are oriented oppositely relative to one another, are thus moved into an opposed arrangement facing toward one another within the groove 95, as shown partially in FIGS. 8 and 9.

Figure 8:
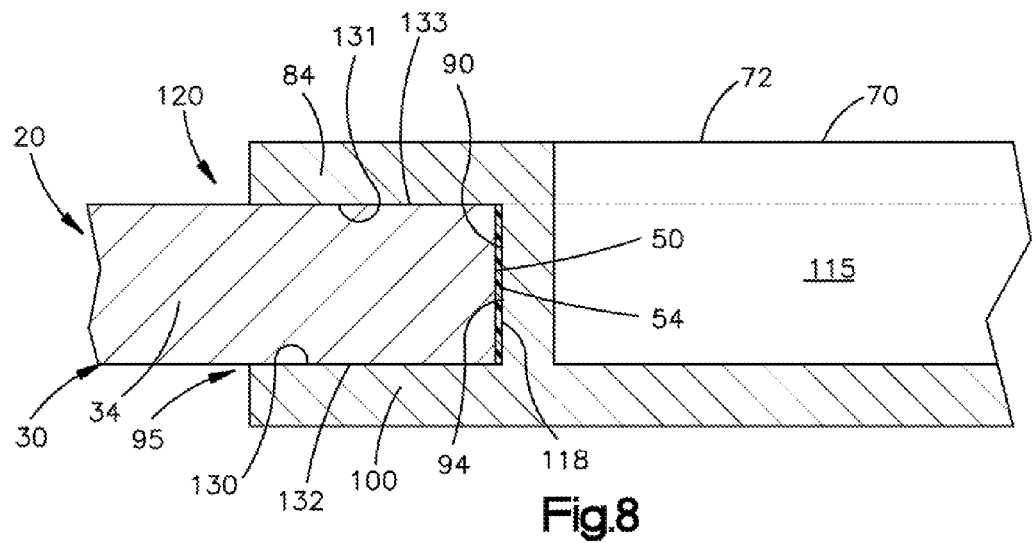
FIG. 8 is an enlarged sectional view of interconnected parts shown in FIG. 5.
Figure 9:
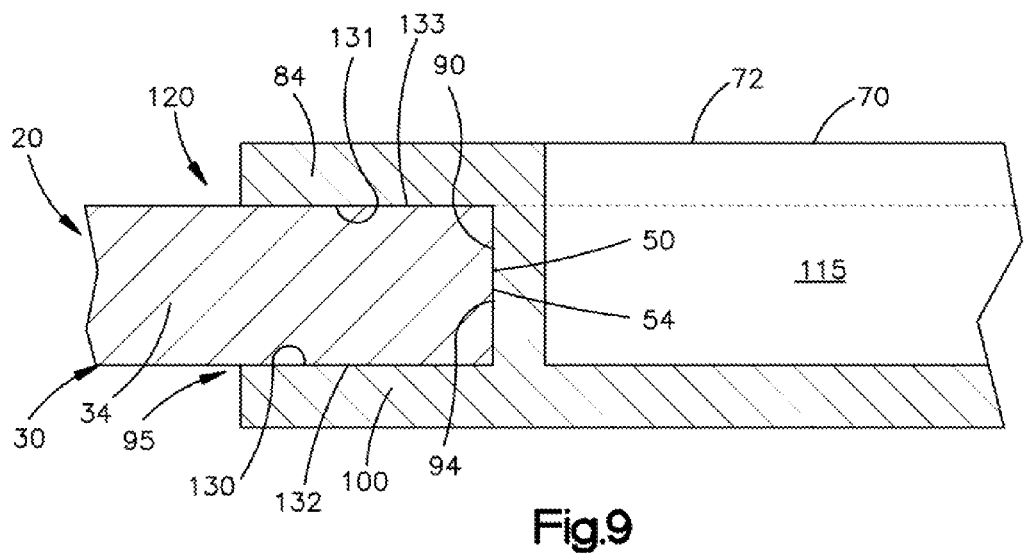
FIG. 9 is a view similar to FIG. 8, showing interconnected parts of an additional embodiment.

In the embodiment shown in FIG. 8, a sealant 118 or structural adhesive may be applied to the mating edge 90 of the fitting body 72 prior to the fitting 70 being installed to the vent stringer 20 (see also FIG. 4). The sealant 118 may be interposed between to the mating edge 90 of the fitting body 72 and the outer edge 50 of the open end 45 of channel 30, and forms an adhesive bond between the opposed edges 90 and 50. In an alternative embodiment as shown in FIG. 9, the sealant 118 may be omitted. If the sealant 118 (FIG. 8) is omitted, then the mating edge 90 of the fitting 70 may abut against the outer edge 50 of the vent stringer 20 along the entire length, or substantially the entire length, of the portion 54 of the outer edge (FIG. 2).

Referring to FIGS. 2, 8 and 9, the groove 95 of the fitting 70 may define a channel that generally corresponds with the profile of the outer edge 50 of the vent stringer 20. In a specific embodiment, the groove 95 of the fitting 70 may be shaped to receive the outer edge 50 of the vent stringer 20, and the groove 95 of the fitting 70 creates a tongue and groove joint 120 (shown in FIGS. 5, 8 and 9). The tongue and groove joint 120 may create a labyrinth seal between the fitting 70 and the vent stringer 20, which may prevent leakage of the contents of the channel 30, which in embodiments may be liquid fuel or vented fuel fumes. A portion of the sides 34, 36, 38 immediately adjacent the outer edge 50 of the channel 30 of the vent stringer 20 may be captured within the groove 95 of the fitting 70. The tongue and groove joint 120 may provide a more secure engagement between the fitting 70 and the vent stringer 20, as compared with the prior art arrangement of FIG. 3 in which parts of the fitting 60 are merely placed in overlying engagement with the channel 30 to cover the channel 30 at the open end 45.

Referring, to FIGS. 8 and 9, the inner lip 100 of the fitting 70 may extend into the channel 30 of the vent stringer 20, where an upper surface 130 of the lip 100 abuts an interior surface 132 of the vent stringer 20. Similarly, the under surface 131 of the bottom side 84 may abut the adjacent top surface 133 of the bottom side 34 of the channel 30. The sealant 118 and/or adhesive bond may extend further between these adjacent surfaces 130, 132 and 131, 133. This engagement may continue about, or substantially about, the entire portion 54 of the outer edge 50. Thus, at least the bottom side 34 may be captured between the bottom side 84 and the lip 100 of the fitting body 72 and prevent movement of the fitting 70 upward or downward (as shown in FIGS. 8 and 9) relative to the bottom side 34 of the channel 30. The abutment between the upper surface 130 of the inner lip 100 and the interior surface 132 of the channel 30 of the vent stringer 20 may prevent or restrict removal of the fitting 70 from the channel 30 in an upward direction as viewed in FIGS. 8 and 9. In contrast, the prior art fitting 60 shown in FIG. 3 must rely entirely on fasteners to prevent removal in any direction.

As further shown in FIG. 5, the fitting 70 may continue the contour of the bottom side 34 of the channel 30 onto the corresponding bottom side 84 of the fitting body 72, and may continue the contours of the opposed sides 36 and 38 of the channel 30 onto the corresponding sides 86 and 88 of the fitting body 72. The base wall 112 on the fitting 70 may adjoin the portion of the wing panel 14 forming the duct 43 of the channel 30. The opposing side walls 96 and 98 on the fitting 70 may generally oppose the sides 36 and 38 of the channel 30 at the inside of the channel 30. The end wall 110, which may extend fully between the base wall 112 and the side walls 96 and 98 of the fitting 70, may completely, or substantially completely, close the open end 45 of the channel 30. The end wall 110, the side walls 96 and 98, and the base wall 112 of the fitting 70 thus extend within the channel 30 between the sides 34, 36 and 38 of the channel 30 to establish a fluid-tight and gas-tight closure of the open end 45.

Figure 7:
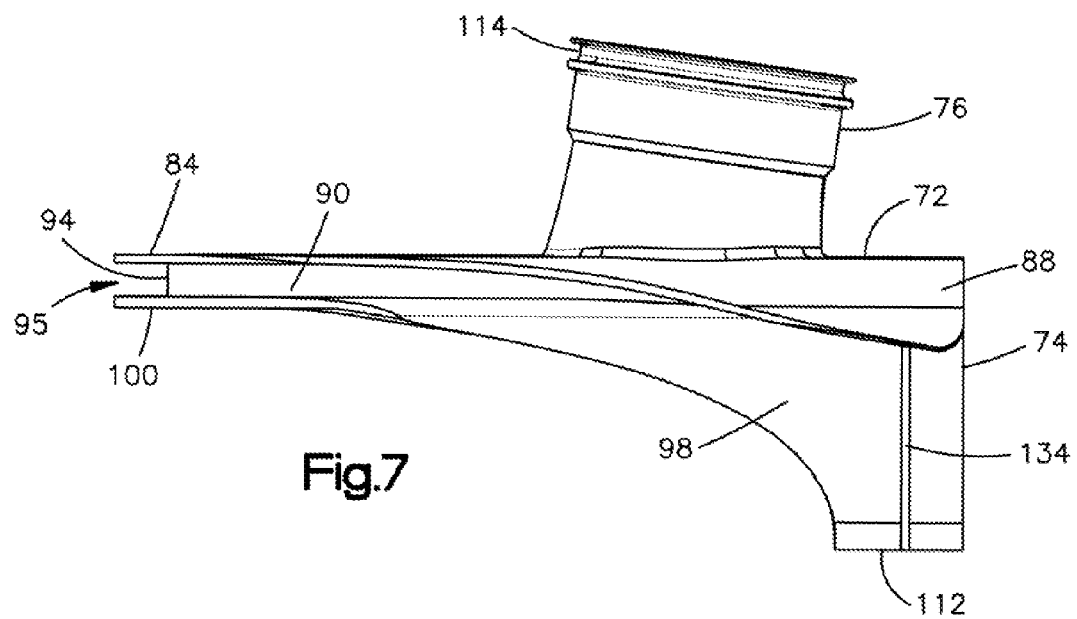
FIG. 7 is a side view of the fitting of FIG. 4

In a preferred embodiment, the fitting body 72, the wall structure 74 and the coupling 76 may be interconnected separately from the vent stringer 20. The fitting 70 may be formed of a composite material and may be formed as a single unitary body of composite material that includes the fitting body 72, the wall structure 74 and the coupling 76. In other embodiments, the fitting 70 may be made from molded thermoplastic to better match the stiffness of the composite material of the associated stringer 20. In a preferred method of installing the fitting 70, fasteners 122 (FIG. 5] may be installed as needed, but a sealant may be applied to form both a seal and an adhesive bond between the fitting 70 and the vent stringer 20 to minimize the use of fasteners. In one specific embodiment, sealant 136 may be placed into an end groove 134 (shown in FIGS. 4, 6 and 7) located along the side walls 96 and 98, radii 111, and the base wall 112 of the fitting 70.

In one specific embodiment, a single pair of fasteners 122 may be located on the side opposing walls 96, 98 of the fitting 70, shown in FIG. 5, may be employed. The fasteners 122 may extend through the opposing walls 96, 98 and into the adjacent sides 36, 38 of the channel 30. The fasteners 122 may be selected from screws, pins rivets, nut and bolt combinations, and other mechanical fasteners that provide a positive mechanical connection between the fitting 70 and the channel 30. The fasteners 122 may prevent sliding movement of the fitting 70 relative to the channel 30 in a direction parallel to, or substantially parallel to, arrow D, namely, in a direction into and out of the end 45 of the channel 30. Thus, the fitting 70 may be attached securely to the stringer 20 entirely by the engagement of the lip 100 and bottom side 84 with the bottom side 84 of the channel 30, and the engagement of the fasteners 122 with the sides 36, 38 of the channel. It is to be understood that additional fasteners 122 may be employed to secure the fitting 70 to the channel 30, in a specific embodiment between the base wall 112 and the wing panel 14. However, it is desirable to minimize the number of fasteners 122 in order to minimize the weight of the fitting 70.

Another advantage of the fitting 70, as shown in FIG. 5 is that the compact design of the fitting 70, and the tongue and groove connection, provides a secure attachment to the channel 30 without interfering with fasteners 135 through the splice chord.

In an embodiment, a method of installing the fitting 70 to the end 45 of the vein stringer 20 may include sliding the fitting in the longitudinal direction D along the vent stringer, receiving the outer edge 50 of the vent stringer in the groove 95 of the fitting body 72, wherein the groove of the fitting body is shaped to receive the outer edge of the vent stringer to create a tongue and groove joint with the outer edge; and providing a connection between the fitting and the stringer to prevent further slidable movement of the fitting relative to the stringer. In embodiments, the connection may take the form of one or both of a positive mechanical connection effected by fasteners 122, and a sealant 136.

Figure 10:
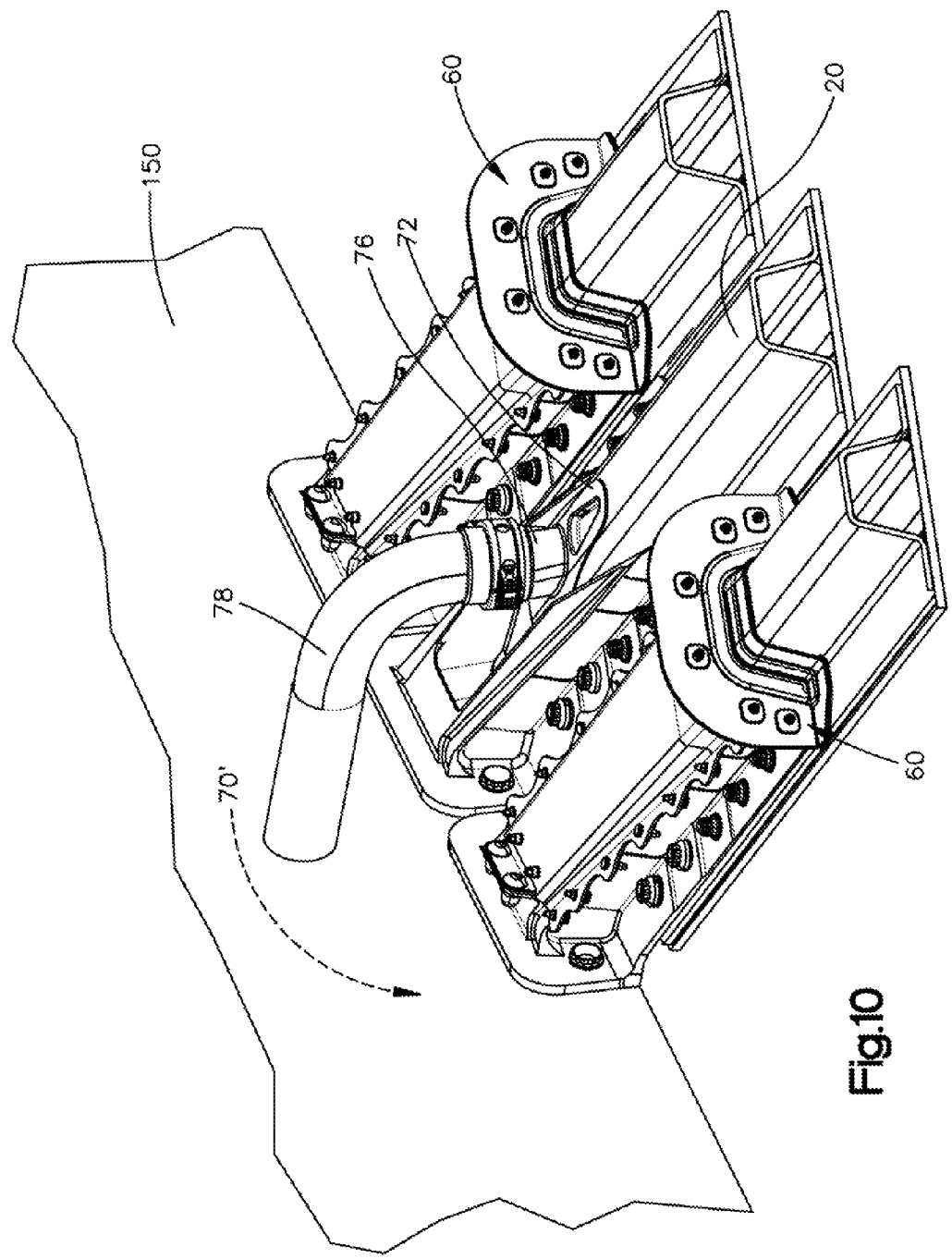
FIG. 10 is a perspective view of the fitting of FIG. 4, shown adjacent to a rib chord, and a prior art fitting.

As shown in FIG. 10, the fitting 70 may be attached to close off a stringer 20 adjacent a rib chord 150. The vent tube 78 may be attached to the coupling 76 and extend over the rib chord 150 to a fitting 70' (see also FIG. 11) on the other side of the rib chord. Thus, the fitting 70, with the vent tube coupling 76 extending from the bottom side 84 of the fitting, may be configured to bypass the rib chord 150 without having to structurally penetrate the rib chord 150, such as by cutting a hole through it, as is the case with the prior art fitting 60.

Figure 11:
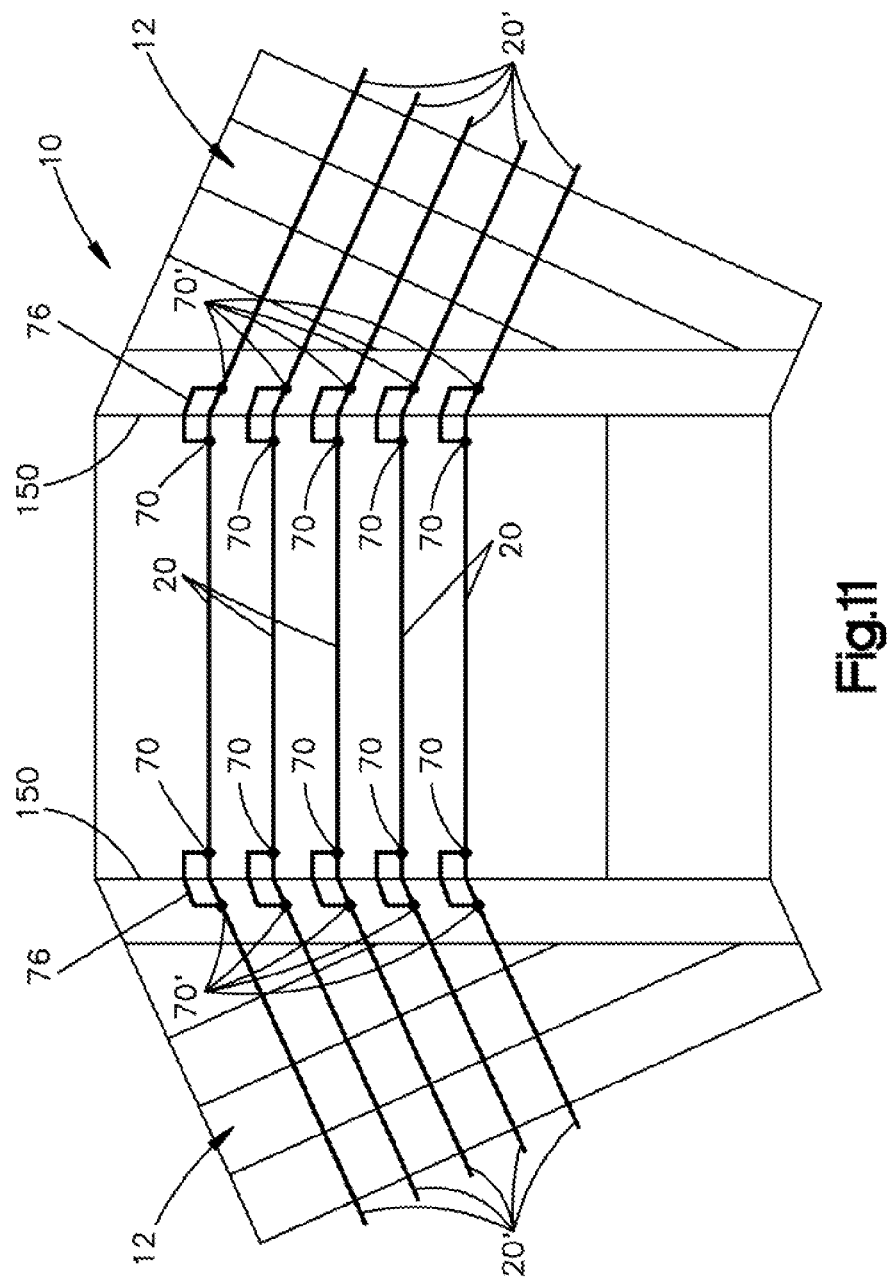
FIG. 11 is a schematic plan view showing implementation of the fitting of the disclosed fitting, on a aircraft.

An exemplary implementation of the fitting 70 on an aircraft 10 is shown in FIG. 11. A plurality of fittings 70, 70' may be employed to provide continuous, fluid-tight and vapor-tight connections between stringers 20 and stringers 20' on an opposite side of rib chord 150. An advantage of this system of fittings 70, 70' interconnected by vent tubes 76 is that construction is simplified, at the SOB joint, and relatively shorter fittings may be employed.

Figure 3:
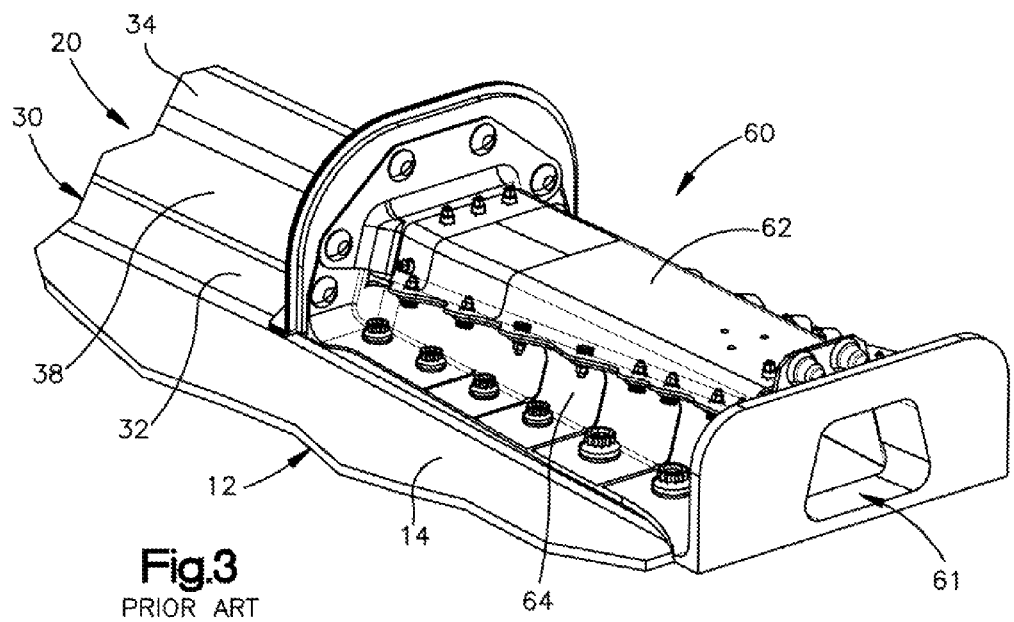
FIG. 3 is a view similar to FIG. 2, showing a prior art fitting installed on the prior art vent stringer.

Referring generally to FIGS. 1-11, the disclosed fitting 70 as described above provides a simple approach for connecting a vent, stringer with a vent tube, especially when compared to the current approach using conventional fittings as seen in FIG. 3. The disclosed fitting 70 may also require a reduced amount of sealant and fewer fasteners when compared to other conventional fitting that are currently available. Specifically, as seen in FIG. 5 the disclosed fitting 70 typically only requires only two fasteners 122 for securement to the vent stringer 20. In contrast, as seen in FIG. 3, conventional fittings currently available generally require numerous fasteners for securing the fitting to the vent stringer. Moreover, the disclosed fitting 70 may also reduce the amount of vent tubing needed to connect the vent stringers with one another, eliminate the need for a seal dam located inside the vent stringer along the fitting, and may also eliminate the need to seal fasteners inside the vent stringer. Finally, the disclosed fining ma allow for components to be installed prior to wing-to-body join in an aircraft.

While the methods and forms of apparatus disclosed herein may constitute preferred aspects of the disclosed vent stringer fitting, it is to be understood that the invention is not limited to these precise forms and methods, and that changes may be made therein without departing from the scope of the invention.

What is claimed is:

1. A fitting for a vent stringer, the vent stringer having a channel, an open end and an outer edge defining the open end, the fitting comprising:
   a fitting body receivable along the open end of the vent stringer, the fitting body defining:
      a groove that generally corresponds with a portion of the outer edge of the vent stringer, the groove of the fitting body shaped to receive the portion of the outer edge of the vent stringer to create a tongue and groove joint with the portion of the outer edge of the vent stringer;

a pair of opposing side walls and a base wall that each extend around a portion of the open end of the vent stringer, wherein the pair of opposing side walls and the base wall extend into the channel of the vent stringer to create a seal with a portion of the open end of the vent stringer; and a connection between the fitting and the stringer to prevent slidable movement of the fitting relative to the stringer.

2. The fitting of claim 1, wherein the fitting body defines a mating edge located within the groove.

3. The fitting of claim 2, wherein the mating edge of the fitting body abuts the outer edge of the vent stringer.

4. The fitting of claim 2, further comprising a sealant interposed between the mating edge of the fitting body and the outer edge of the vent stringer.

5. The fitting of claim 1, wherein the fitting further comprises a lip, and wherein the lip is configured to extend into the channel of the vent stringer.

6. The fitting of claim 1, wherein the fitting further comprises a coupling configured to fluidly connect the channel of the vent stringer with a vent tube.

7. The fitting of claim 1, wherein the fitting body is constructed of a composite material.

8. An aircraft comprising:

a vent stringer having a channel, an open end and an outer edge located at the open end; and a fitting having a fitting body receivable along the open end of the vent stringer, the fitting body defining a groove that generally corresponds with a portion of the outer edge of the vent stringer, the groove of the fitting body shaped to receive the portion of the outer edge of the vent stringer to create a tongue and groove joint with the portion of the outer edge of the vent stringer, a pair of opposing side walls and a base wall that each extend around a portion of the open end of the vent stringer, wherein the pair of opposing side walls and the base wall extend into the channel of the vent stringer to create a seal with a portion of the open end of the vent stringer; and a connection between the fitting and the stringer to prevent slidable movement of the fitting relative to the stringer.

9. The fitting of claim 8, wherein the fitting body defines a mating edge located within the groove.

10. The fitting of claim 9, wherein the mating edge of the fitting body abuts the outer edge of the vent stringer.

11. The fitting of claim 9, further comprising a sealant interposed between the mating edge of the fitting body and the outer edge of the vent stringer.

12. The fitting of claim 8, wherein the fitting further comprises a lip, and wherein the lip is configured to extend into the channel of the vent stringer.

13. The fitting of claim 8, wherein the fitting further comprises a coupling configured to fluidly connect the channel of the vent stringer with a vent tube.

14. A method of installing a fitting to a vent stringer, the vent stringer having a channel, an open end and an outer edge located at the open end, the method comprising:

sliding the fitting in a longitudinal direction along the vent stringer, wherein the fitting defines a groove that generally corresponds with the outer edge of the vent stringer;

receiving a portion of the outer edge of the vent stringer by the groove of the fitting body, wherein the groove of the fitting body is shaped to receive the outer edge of the vent stringer to create a tongue and groove joint with the portion of the outer edge of the vent stringer;

creating a seal between a pair of opposing side walls and a base wall of the fitting and a portion of the open end of the vent stringer, wherein the pair of opposing side walls and the base wall extend into the channel of the vent stringer to create a seal with the portion of the open end of the vent stringer; and providing a connection between the fitting and the stringer to prevent further slidable movement of the fitting relative to the stringer.

15. The method of claim 14, further comprising coupling a vent tube to the fitting.

16. The method of claim 14, wherein providing a connection between the fitting and the stringer includes one or both of providing a positive mechanical connection between the fitting and the stringer, and providing a sealant between the fitting body and the stringer.

* * * * *